United States Patent [19]
Linville, Jr. et al.

[11] Patent Number: 5,051,963
[45] Date of Patent: Sep. 24, 1991

[54] PROCESS FOR CANCELLING STATIONARY SINUSOIDAL NOISE IN SEISMIC DATA

[75] Inventors: Andrew F. Linville, Jr., Dallas; Robert A. Meek, Sanger, both of Tex.

[73] Assignee: Mobil Oil Corporation

[21] Appl. No.: 550,006

[22] Filed: Jul. 9, 1990

[51] Int. Cl.$^5$ .............................................. G01V 1/36
[52] U.S. Cl. ..................................... 367/46; 367/43; 364/421; 364/724.01
[58] Field of Search ...................... 367/38, 39, 43, 46, 367/49; 364/421, 724.01, 724.06, 724.08

[56] References Cited
U.S. PATENT DOCUMENTS 4,397,006  8/1983  Galbraith, Jr. ....................... 367/40
4,750,156  6/1988  Abrams et al. ....................... 367/43
4,853,903  8/1989  Linville, Jr. et al. ................ 367/46

Primary Examiner—Ian J. Lobo

[57] ABSTRACT

An improved method for cancelling a stationary sinusoid corrupting a data trace is described. The frequency of the corrupting sinusoid is determined precisely and a Wiener-Levinson least squares filter is designed, using a reference sinusoid at precisely the determined frequency and correlated with the corrupted data trace. The filter is applied to the reference trace yielding a noise estimate which can then be subtracted from the data trace.

18 Claims, 9 Drawing Sheets

PROCESS FOR CANCELLING STATIONARY SINUSOIDAL NOISE IN SEISMIC DATA

FIELD OF THE INVENTION

This invention relates to removal of stationary sinusoidal noise, that is, a sinusoidal signal of constant frequency, amplitude and phase, from data records. More particularly, this invention relates to a method for cancelling such stationary sinusoidal noise from seismic data records without attenuating energy of any other frequency.

BACKGROUND OF THE INVENTION

Seismic exploration of the earth for oil, gas, and other valuable minerals is commonly performed. In these techniques, energy is imparted to the earth at a first location, termed a "shot point", travels into the earth, is reflected at interfaces between rock layers in the earth, returns to the surface and is detected by a number of detectors spread along a line extending from the shot point. Where land based exploration is being carried out, typically the energy is imparted to the earth by detonating a charge of dynamite, dropping a heavy weight or vibrating a massive object at the surface of the earth, and the detectors are normally termed "geophones". Where water-based exploration is being carried out, energy is imparted to the earth by releasing a quantity of compressed air into the water at regular intervals, and the detectors are termed "hydrophones". In either case, the signals output by the detectors are recorded individually as a function of time for subsequent processing.

The fact that the seismic energy must travel deeply into the earth and be reflected at interfaces between the rock layers and travel upwardly to be detected by the detectors means inevitably that the detected signal strength is relatively weak and, correspondingly, that the signal-to-noise ratio of the signals is normally rather low. The art has developed numerous techniques for removing noise from seismic records. Many of these techniques rely on the fact that much of the noise is uncorrelated, i.e., essentially random. Therefore, if similar records can be selected and summed together, normally the random noise will cancel out, whereas the signal will be strengthened. This process is usually referred to as stacking. The art also recognizes that often the seismic records are corrupted by strong steady state signals, e.g., 60 Hz energy from power lines, generators and the like, and the art shows methods of removing such consistent interference from the seismic records. For example, in the 60 Hz case, typically a notch filter can be applied to the data in generally known fashion to notch out the interfering frequency. However, a notch filter has some minimal bandwidth in which energy is removed from the signal so that some of the data is inevitably lost.

U.S. Pat. No. 4,853,903 to one of the inventors and several other persons (hereinafter "the '903 patent"), which patent is not prior art with respect to the present application, but is incorporated herein by reference, shows a particularly preferred method of designing and applying such a notch filter to seismic data. As indicated above, the notch filter described in that patent removes energy from the seismic records over some finite bandwidth, not merely the precise frequency of interest, and therefore some data is inevitably lost in its use.

SUMMARY OF THE INVENTION

It is therefore an object of the invention to provide a method for cancelling sinusoidal energy of known frequency from the data without attenuating energy of any other frequency in the data, and thus corrupting the data as little as possible. These and other objects of the invention which will appear as the discussion thereof proceeds are satisfied by the present invention. First, the frequency of the interfering noise is determined precisely. A sinusoidal reference trace is then generated which precisely matches, in frequency, the sinusoidal noise corrupting the data trace. The sinusoidal reference trace is autocorrelated with itself and crosscorrelated with the data trace. The results of these steps are then employed in a filter design step resulting in a filter which is then convolved with the reference trace to yield a noise estimate. The noise estimate can then be subtracted from the corrupted data trace to yield an uncorrupted data trace.

In preferred embodiments of the invention, each trace can also be individually examined to determine whether it is, in fact, corrupted by the noise. Certain portions of the traces can also be deemed more appropriate for determination of the frequency and for filter design than others.

BRIEF DESCRIPTION OF THE DRAWINGS

The invention will be better understood if reference is made to the accompanying drawings, in which.

DESCRIPTION OF THE PREFERRED EMBODIMENTS

As indicated above, this invention relates to the cancellation of stationary sinusoidal noise, i.e., noise of invariant amplitude, frequency and phase, from a seismic data recording. There are many situations in which the method of the invention has use. For example, the invention has particular application to removal of noise such as that due to generators, power lines, and the like in the vicinity of the exploration area. It has been reported that the line frequency in the United States rarely deviates by more than 0.03 Hz from the 60 Hz nominal frequency. However, even if the line frequency does deviate somewhat from the 60 Hz nominal frequency or if the noise is from some other source at some other frequency, if it is stationary, (i.e., essentially invariant in frequency and amplitude during the relevant recording period), it can be cancelled using the method of the invention.

Figure 1:
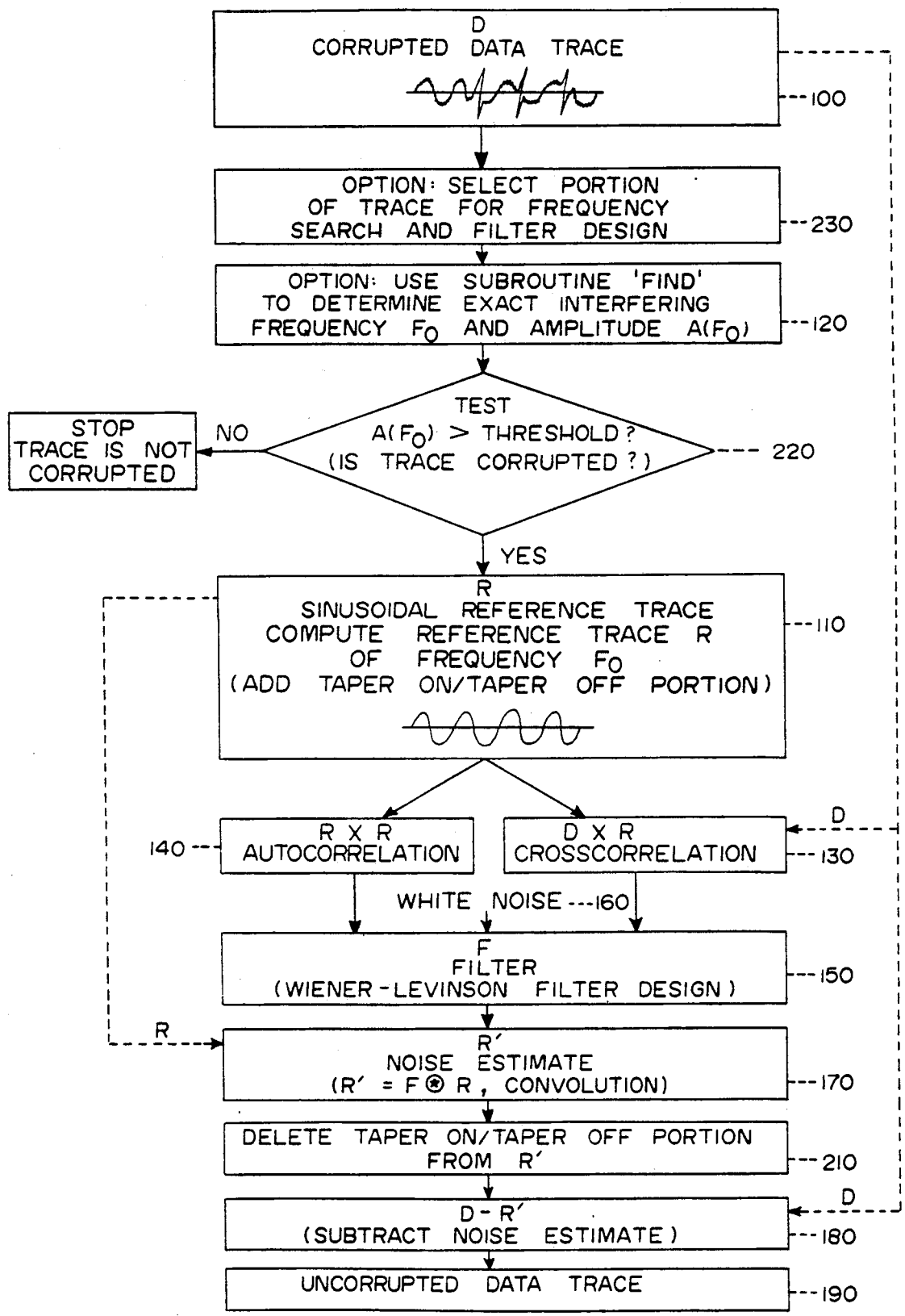
FIG. 1 shows a flow chart of the process of the invention, including certain optional steps.

FIG. 1 shows a schematic flow chart of the process of the invention. The principal steps will be described first, and various options and desired additional features will be described separately. The process of the invention involves selection of a corrupted data trace at step 100 from a seismic record. As depicted in step 100, the data trace involves relatively "spiky" returns of seismic energy after reflection from interfaces within the earth, superimposed on a generally regular sinusoidal noise component. It is the object of the invention to cancel the sinusoidal noise component, leaving only the comparatively "spiky" data.

A sinusoidal reference trace is generated at step 110. Where the frequency of the noise is known precisely, as in the case of 60 Hz power line interference discussed above, the reference trace can be readily generated by any of a wide variety of known processes, which generate a series of values equivalent to digital samples of the sinusoid. Where the frequency is not known precisely, a subroutine 'FIND', discussed below in connection with FIG. 2 can be employed, as indicated at step 120.

The corrupted data trace is crosscorrelated with the reference trace at step 130, and the sinusoidal reference trace is autocorrelated at step 140. These correlation functions provide the required input to the usual process of Wiener-Levinson filter design, which is carried out at step 150. As indicated, the inputs to this step are the correlation functions calculated in the crosscorrelation step 130 and in the autocorrelation step 140. A small amount of white noise, indicated at step 160, is added to ensure that the filter design process is stable. The process of Wiener-Levinson filter design is well understood in the art. Preferably, a least squares filter design process is employed, as is entirely conventional. An improvement in efficient filter design is discussed below in connection with FIG. 3.

When the Wiener-Levinson filter has been designed at step 150, yielding a series F of filter coefficients, the filter is convolved with the reference trace R at step 170. The result is a noise estimate R'. This noise estimate can be subtracted from the corrupted data trace D in step 180, yielding an essentially uncorrupted data trace at step 190.

When the filter is convolved with the sinusoidal reference trace in step 170, the mathematical effect is to precisely align the sinusoidal reference trace with the corrupting sinusoid in the data trace, that is, to insure that the reference sinusoid and the noisy sinusoid to be removed are precisely in phase, and that their amplitudes are equal, so that in the subsequent subtraction step, the noisy sinusoid will be precisely subtracted from the corrupted data trace.

It will be appreciated by those skilled in the art that in application of a typical multi-coefficient digital filter to a trace, the initial and final few points of the trace do not experience the full effect of the filter. Such "end effects" are a general problem when dealing with finite length data traces. It is desirable to eliminate those end effects. Because the reference trace R is computed analytically according to the invention, this can be accomplished at step 110 by making R longer than the actual data trace, with tapering "on" and "off" portions or "tails". The tapered end portions are subsequently deleted at step 210 prior to the subtraction step 180.

It will also occur commonly that only certain traces of a particular set of traces to be processed will actually exhibit sinusoidal noise. For example, records recorded at a distance from a power line will not exhibit 60 Hz interference as markedly as those recorded beneath it. Each trace can be examined to determine if filtering is necessary by using the subroutine 'FIND' to compute the amplitude $A(F_o)$ of the exact frequency of the interfering sinusoid $F_o$ and compare it to a threshold level. This can be done at step 220, detailed in connection with FIG. 2.

It can also occur that only portions of the record exhibit the noise clearly but that it is suspected of corrupting the entire record. Therefore, preferably the method also includes an optional step 230, wherein a portion of the trace is selected for determination of the frequency of the noise to be removed and for design of the appropriate Wiener-Levinson filter. Selection of a portion of a trace for design of the filter is desirable because both the automatic frequency search option (detailed in connection with FIG. 2) and the filter design process (detailed in connection with FIG. 3) work best when the noise is strongest. Indeed, it may be desirable to select the frequency from noise recorded before any signal has been recorded. Alternatively, a section of the record appearing later in the overall record could be used for filter design because at longer intervals from the shot time, the signal amplitude decays and the noise becomes dominant. However, as noted, noise cancellation is applied according to the invention over the entire trace regardless whether only a portion is used to design the filter.

Figure 2:
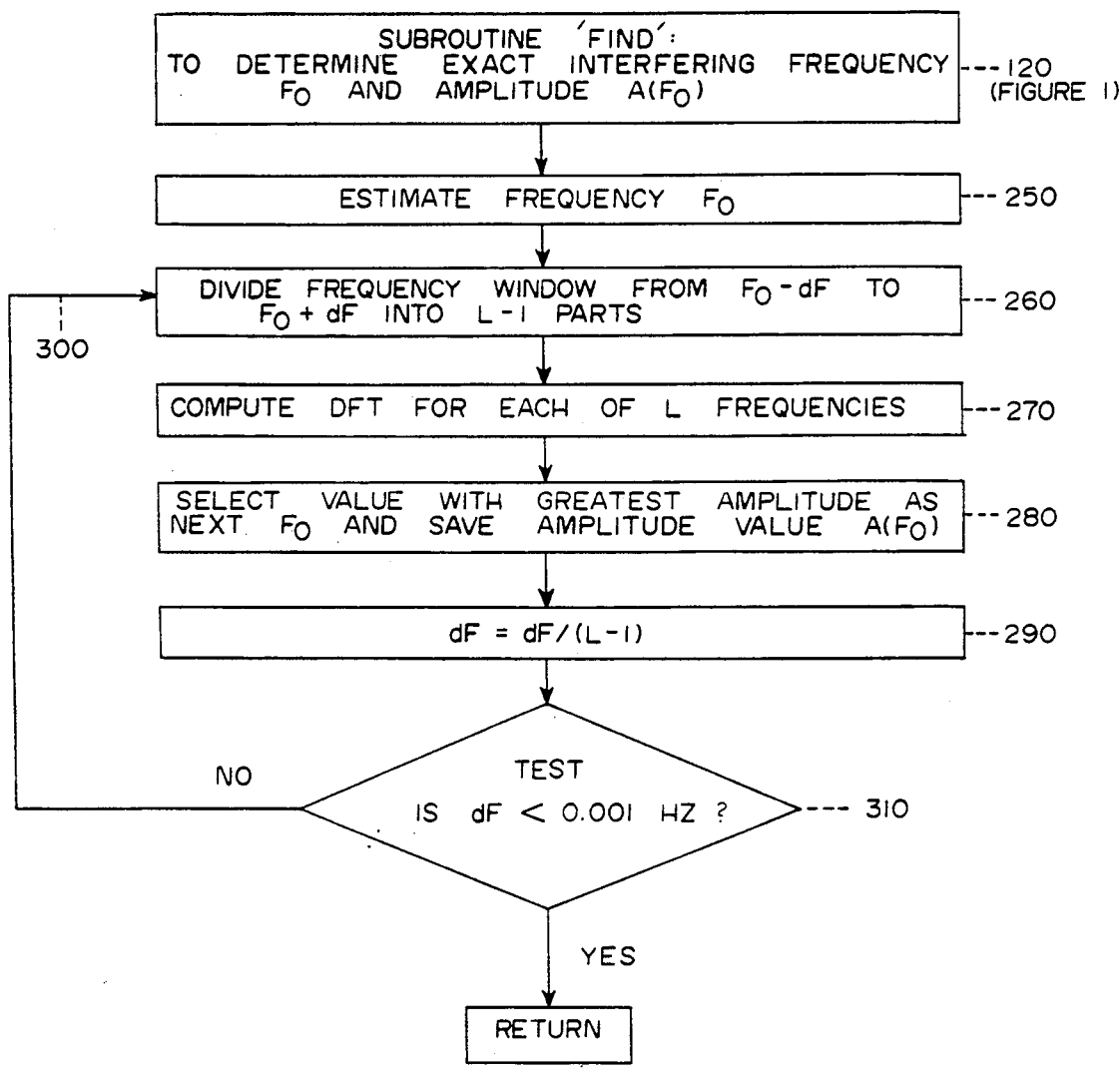
FIG. 2 shows a flow chart of a subroutine used when needed to find the precise frequency to be deleted from the corrupted data record.

As mentioned above, in some cases, the frequency of the interfering sinusoid can be assumed to be a given value, e.g., 60 Hz in the case of power line interference, while in others it may be necessary to calculate the frequency. Preferably, this is done employing a subroutine called 'FIND' in step 120. The exact sequence of steps of the subroutine are shown in FIG. 2. The method begins with an estimation of the frequency $F_o$ to be removed at step 250. One then selects a window about $F_o$ extending from $F_o-dF$ to $F_o+dF$, to insure that the frequency will be within the window, and divides this into $(L-1)$ sub-portions at step 260. L is conveniently 11, so that the window is divided into 10 subportions. The discrete Fourier transform of the energy in the record for each of the L frequencies is then calculated at step 270. The frequency for which the discrete Fourier transform exhibits the highest amplitude is selected in step 280 as the next center frequency $F_o$, and the corresponding amplitude value $A(F_o)$ is saved. The window interval dF is reset in step 290 to be equal to the prior value of dF divided by $(L-1)$. If L is 11, the discrete Fourier transform would be calculated in each step for frequencies spaced by one-tenth their prior spacing. The process is repeated as indicated at 300 until dF is less than 0.001 Hz, as determined at step 310. The corresponding amplitude value $A(Fo)$ thus determined is used to test whether the data trace is actually corrupted, as part of step 220 (FIG. 1). If so, the precise frequency $F_o$ thus selected is used to compute the sinusoidal reference trace, as discussed in step 110 (FIG. 1).

Figure 3:
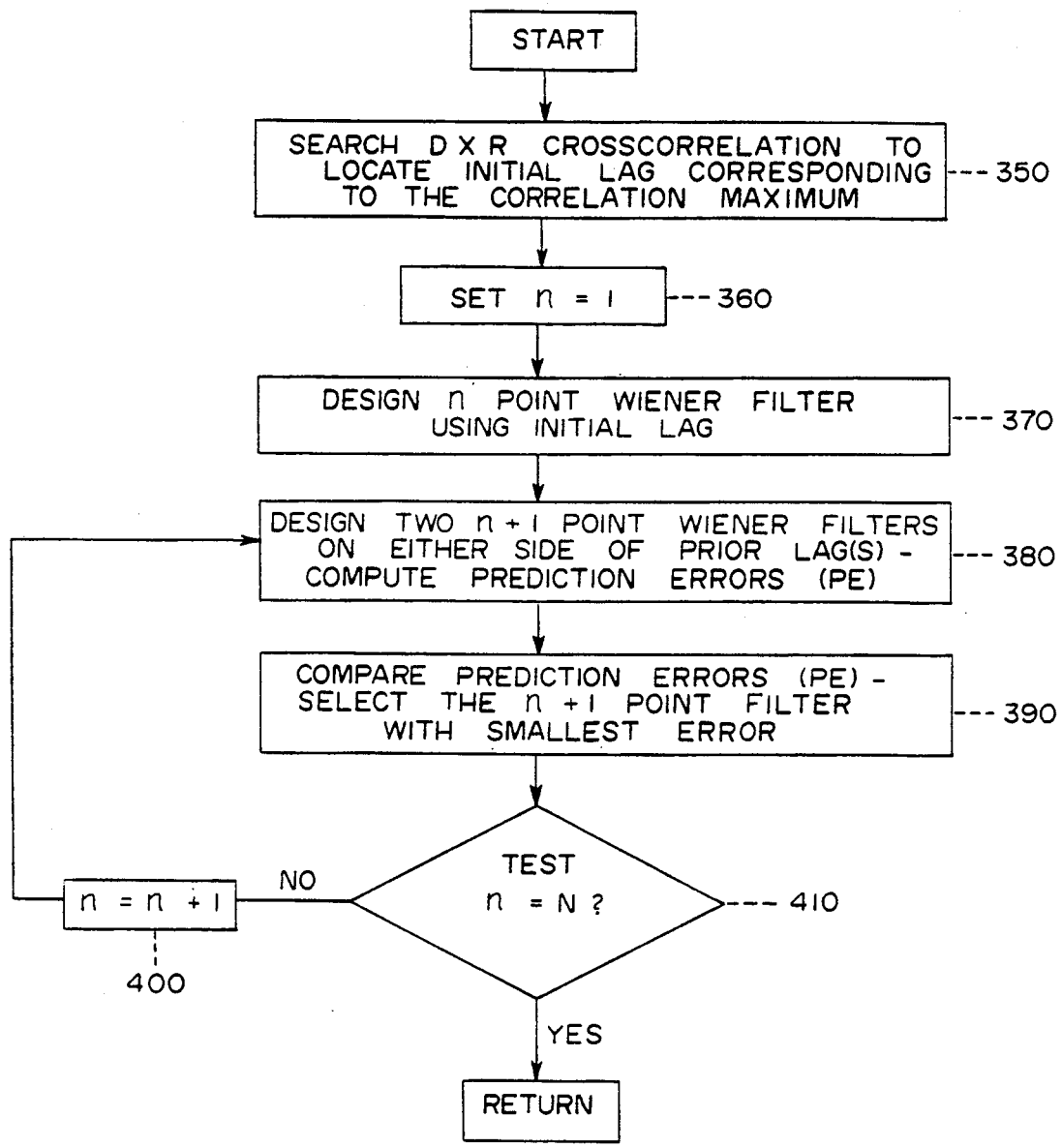
FIG. 3 shows a flow chart of the process used to design the Wiener-Levinson filter used according to the invention.

FIG. 3 shows a detailed flow chart of the steps taken in design of an optimal N-point Wiener-Levinson filter in step 150 (FIG. 1), as performed according to the invention. The desired output of the Wiener-Levinson calculation is an N-point series of filter coefficients which, when applied to the calculated reference sinusoid, will match it in amplitude and phase with the sinusoid to be removed from the data, such that in the subsequent subtraction step, the sinusoidal noise is efficiently and precisely cancelled. As indicated in connection with FIG. 1, the inputs to the filter design step 150 are the crosscorrelation of the data trace D with the sinusoidal reference trace R, which is calculated in step 130, the autocorrelation of the sinusoidal reference trace R, calculated in step 140, and a small amount of white noise.

The required autocorrelation is N lags in length. To insure an optimum N-point filter design, a crosscorrelation length of M lags is required, where M is the integer portion of the quantity $[2.2/(F_o*dt)]$, dt being the sample interval in seconds, and $M>N$. The crosscorrelation of a data trace with a cyclic reference trace produces a cyclic crosscorrelation function; computing this for $M>N$ lags insures that the crosscorrelation maximum is available for filter design. The method used to determine which N lags of the available M lags produce the optimum filter is given in FIG. 3.

The filter design process begins at step 350 with a search of the crosscorrelation coefficients generated in step 130, wherein the corrupted data trace D was crosscorrelated with the reference sinusoid R, to locate the initial lag corresponding to the maximum correlation value. In step 360, the number of points n in the filter being calculated is set initially to 1, so that in step 370, an initial n-point wiener filter can be designed, using the initial lag identified in step 350, with n equal to 1. In step 380, two (n+1) point Wiener filters on either side of the prior lag(s) are designed, and their prediction errors are calculated. This step is carried out according to the Wiener-Levinson filter design algorithm which is described in Levinson, "The Wiener rms (root means square) Error Criteria in Filter Design and Prediction", *J. Math and Physics*, vol. 25, pages 261–278, which is reprinted in Wiener, *Extrapolation, Interpolation and Smoothing of Stationary Time Series with Engineering Applications,* MIT Press (1949).

As is well-known, the prediction error (PE) is a measure of filter performance, such that the smaller the error, the better the performance. The value of the PE is calculable using the Wiener-Levinson algorithm. Thus, in step 390 the two prediction errors calculated as part of the filter design step 380 are compared, and the filter having the smaller error is selected. In subsequent steps 380 and 390, a crosscorrelation lag on either side of the previously selected lags is used to determine which of the two n+1 crosscorrelation lags will produce the n+1 point filter having the best performance.

The process is repeated, each time increasing the number of points n in the filter, as determined at step 400, until a preset maximum value N, typically 3 to 7, is reached for the number of points n in the desired filter as indicated at step 410. At that point, the N-point filter F can be used as indicated at step 170 of FIG. 1 for convolution with the reference trace R to yield a signal R' which can be directly subtracted from the corrupted data.

Figure 4:
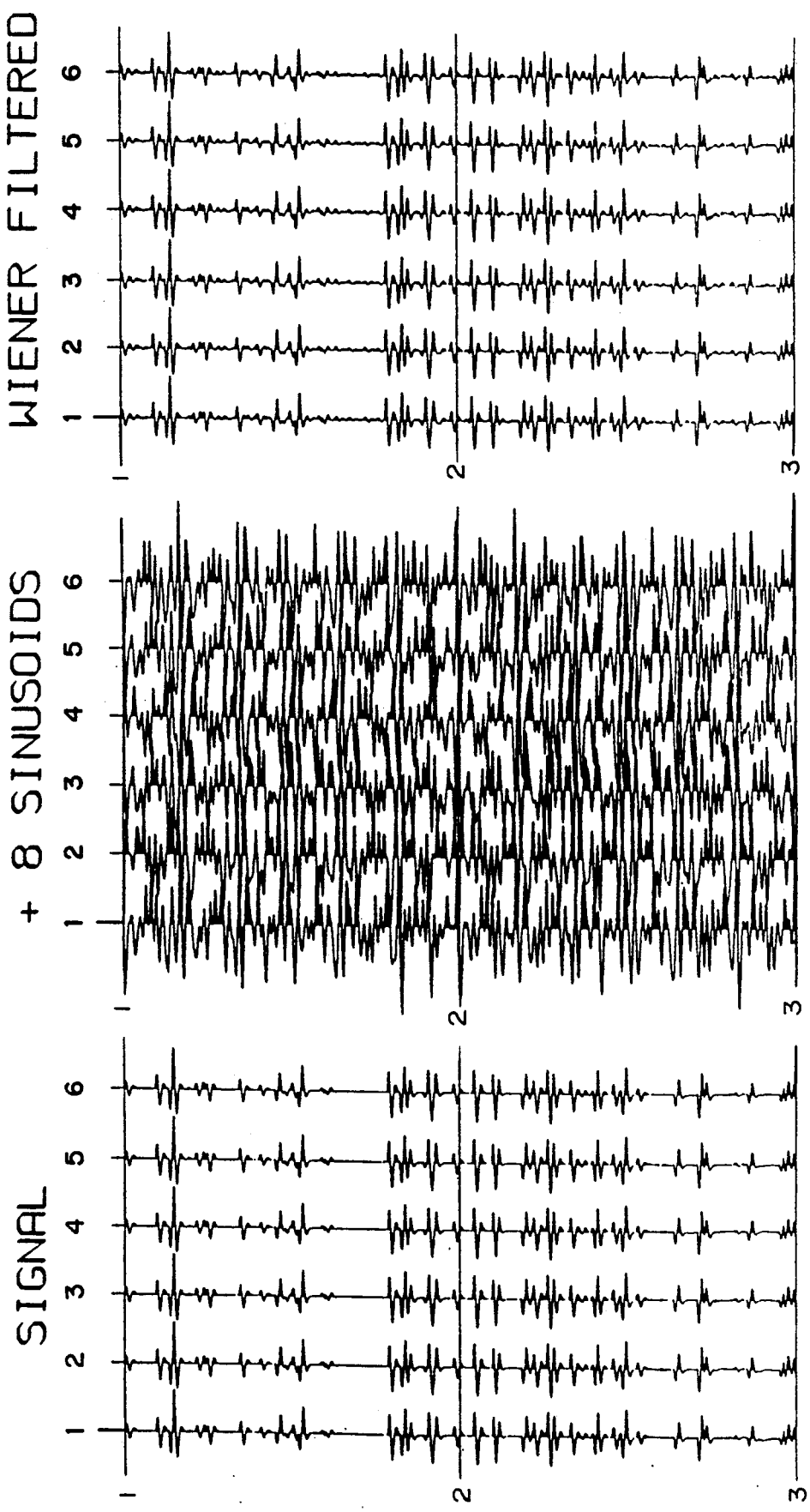
FIGS. 4(a-c) show examples of the use of the process of the invention on synthetic data.

FIGS. 4(a–c) show examples of use of the method of the invention to demonstrate its operation and to show the necessity of cancelling sinusoidal noise early in the processing sequence. A set of synthetic signals, in which amplitude is depicted as a function of time, are shown in FIG. 4(a). This record was constructed by convolving a broad band minimum phase wavelet with a white reflectivity sequence, that is, by convolving a typical impulse response to energy input into the earth with typical sequences of reflection events, resulting in traces of relatively complex shape. FIG. 4(b) shows the signals of FIG. 4(a) having been corrupted by addition of 8 sinusoids of differing frequencies, amplitudes and initial phases, producing the corrupted data records shown. It will be appreciated that the sinusoids are much larger than the largest signals, thus effectively obscuring the data. The method of the invention was then applied to the corrupted records of FIG. 4(b), separately removing the 8 sinusoids with 8 filters, resulting in the filtered traces of FIG. 4(c). It will be appreciated that these are quite closely comparable to the initial input signals shown in FIG. 4(a), indicating that the method of the invention has been very effective in removing the sinusoidal interference.

Figure 5:
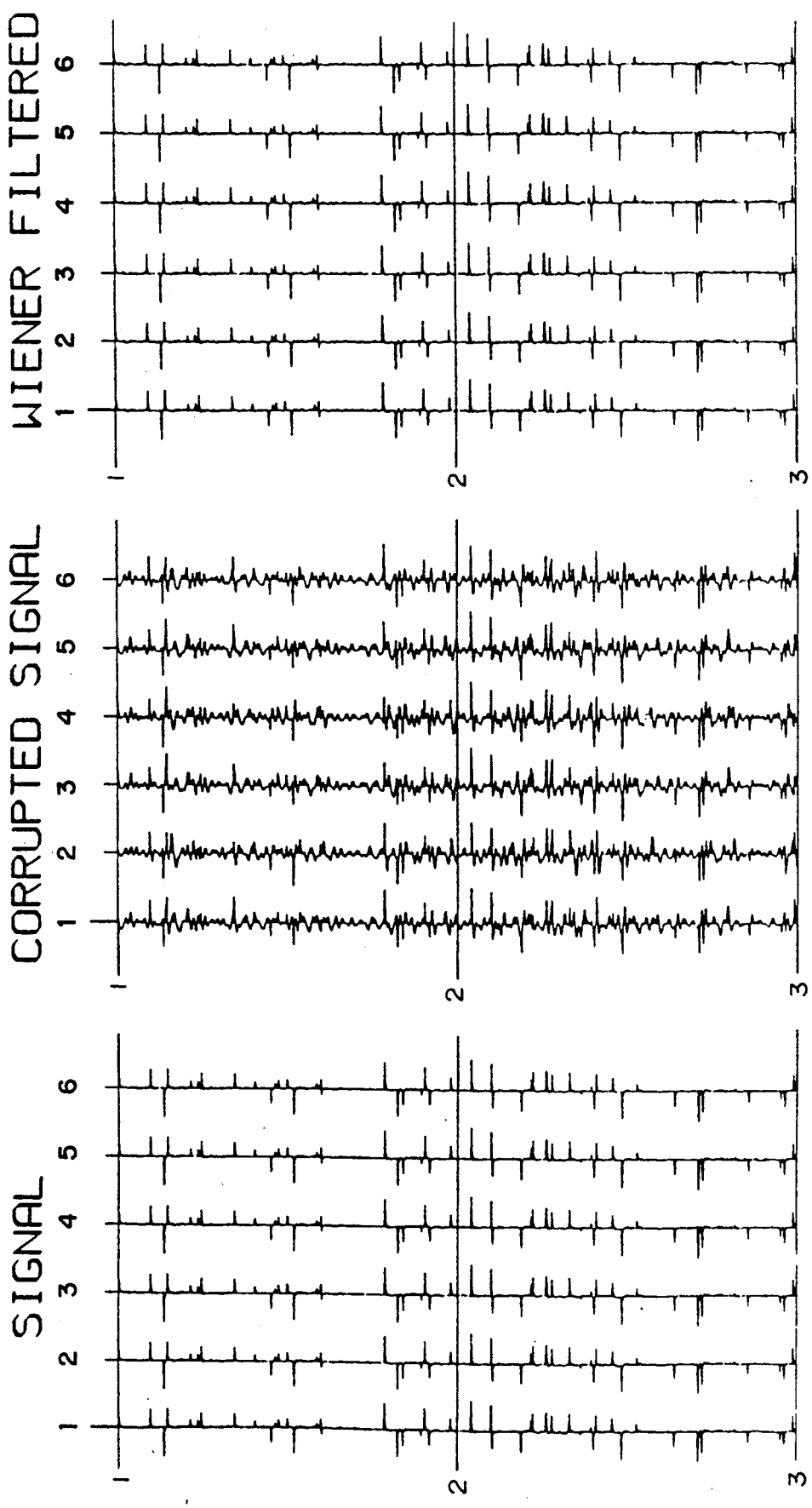
FIGS. 5(a-c) show the process of the invention in combination with the conventional spike deconvolution process.

FIGS. 5(a–c) show the result of the application of the process of the invention in conjunction with "spike deconvolution". Spike deconvolution is commonly carried out for the following reasons. Ideally, in seismic exploration, "spiky" bursts of energy would be transmitted into the earth, and would be detected as similar spikes, thus providing a clear record of their reflection. In many cases, short bursts of sinusoids must instead be used. Further, the shape of the input energy tends to be distorted as it traverses the earth. Both facts complicate the records and make them more difficult to interpret.

Accordingly, a process known as "spike deconvolution" is often employed in order to cause the complex wave forms conventionally recorded to more closely resemble reflected spikes of input energy. If spike deconvolution were carried out ideally, it would result in each of the returned wavelets being reduced to a single spike, thus enabling very clear visual differentiation of the subsurface reflectors from one another. It is known that spike deconvolution has the additional effect of removing some sinusoidal noise from the records.

FIGS. 5(a–c) show the result of applying conventional spike deconvolution to the signal records of FIGS. 4(a–c), respectively. It will be observed that the complex wavelets in the records of FIG. 4(a) are reduced by spike deconvolution to simpler shapes shown in FIG. 5(a). FIG. 5(b) shows application of spike deconvolution to the noise-corrupted records of FIG. 4(b). The sinusoidal interference is indeed reduced by spike deconvolution. Nevertheless, the result shown in FIG. 5(b) still includes substantial noise, in which only the largest reflectors can be identified with certainty. Thus, it can be stated fairly that spike deconvolution applied to records including sinusoidal interference leads to poor signal-to-noise ratios and to signal distortion.

By comparison, applying spike deconvolution as conventionally practiced to the records shown in FIG. 4(c), i.e. the records of FIG. 4(b) having been filtered according to the invention, provides a very nearly perfect result, that is, the corrupted, filtered, and spike-deconvolved records of FIG. 5(c) closely resemble the uncorrupted spike-deconvolved signals of FIG. 5(a). This shows the importance of cancelling sinusoidal noise early in the process. Indeed, as shown by FIGS. 4(a–c), the sinusoidal interference can be effectively cancelled according to the invention, without having to deconvolve the data at this stage of processing, which can be inconvenient.

Figure 6:
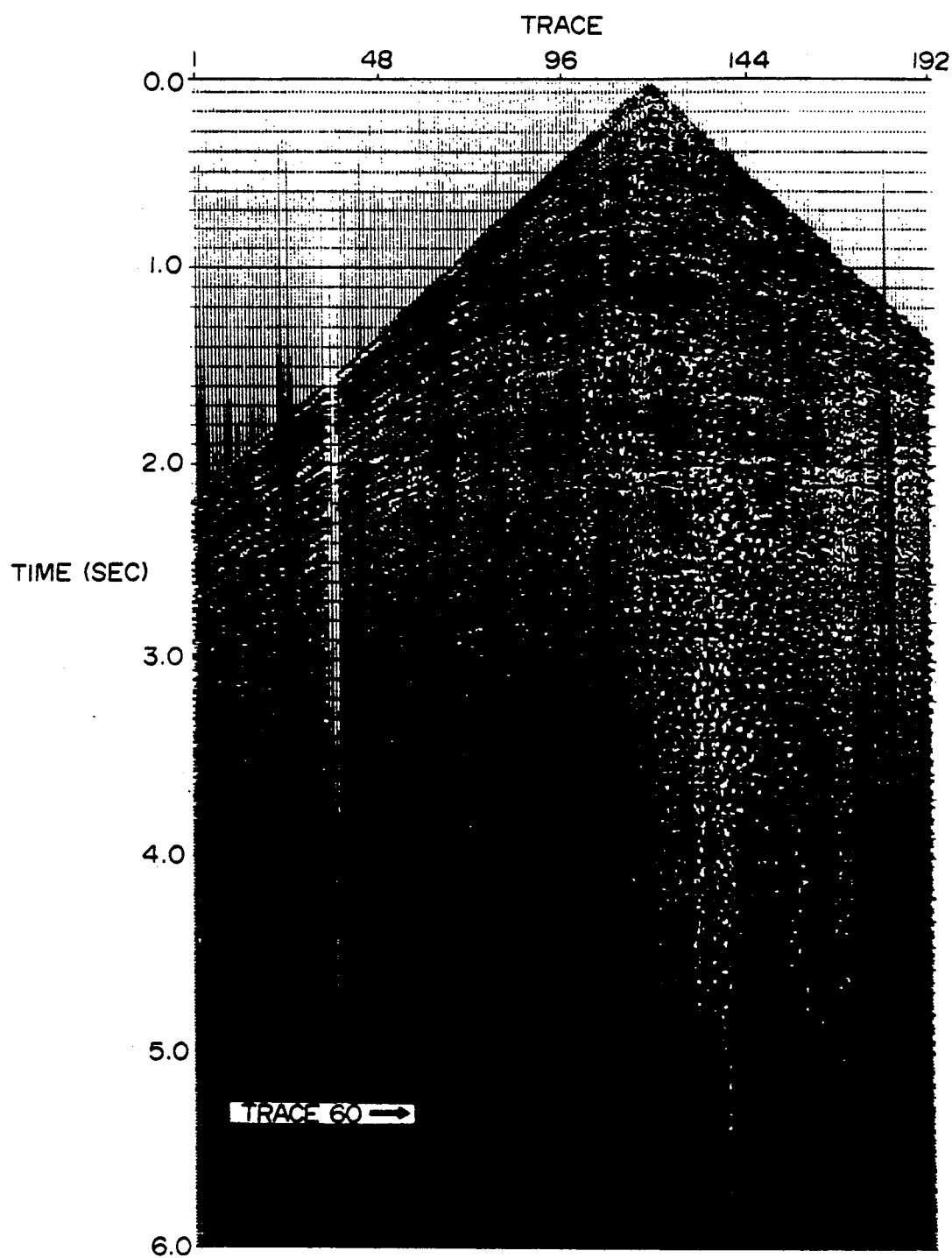
FIGS. 6, 7, and 8 provide displays illustrating application of the process of the invention to a real data record and comparison thereof with the use of a notch filter, as in the '903 patent referred to above.
Figure 7:
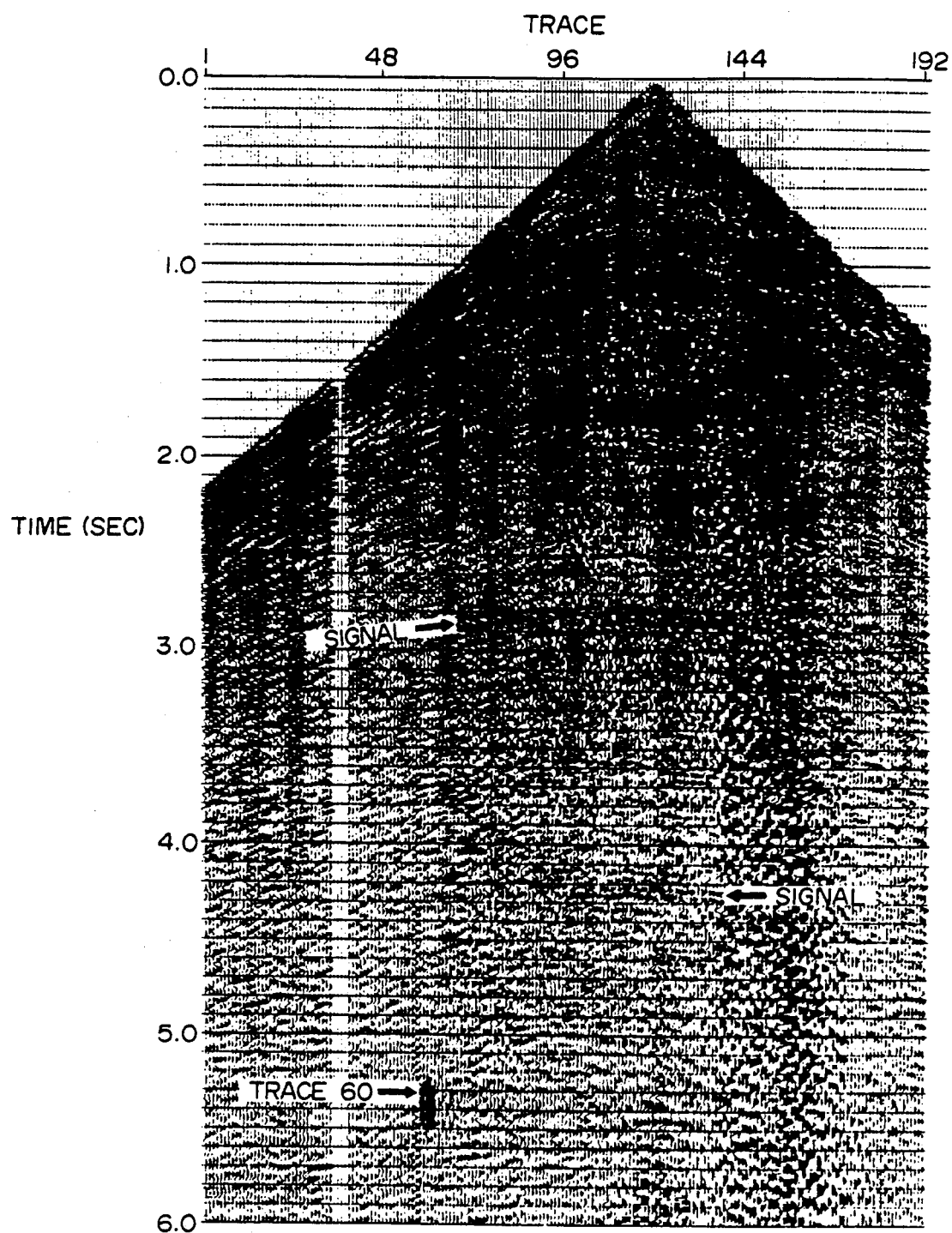
Figure 8:
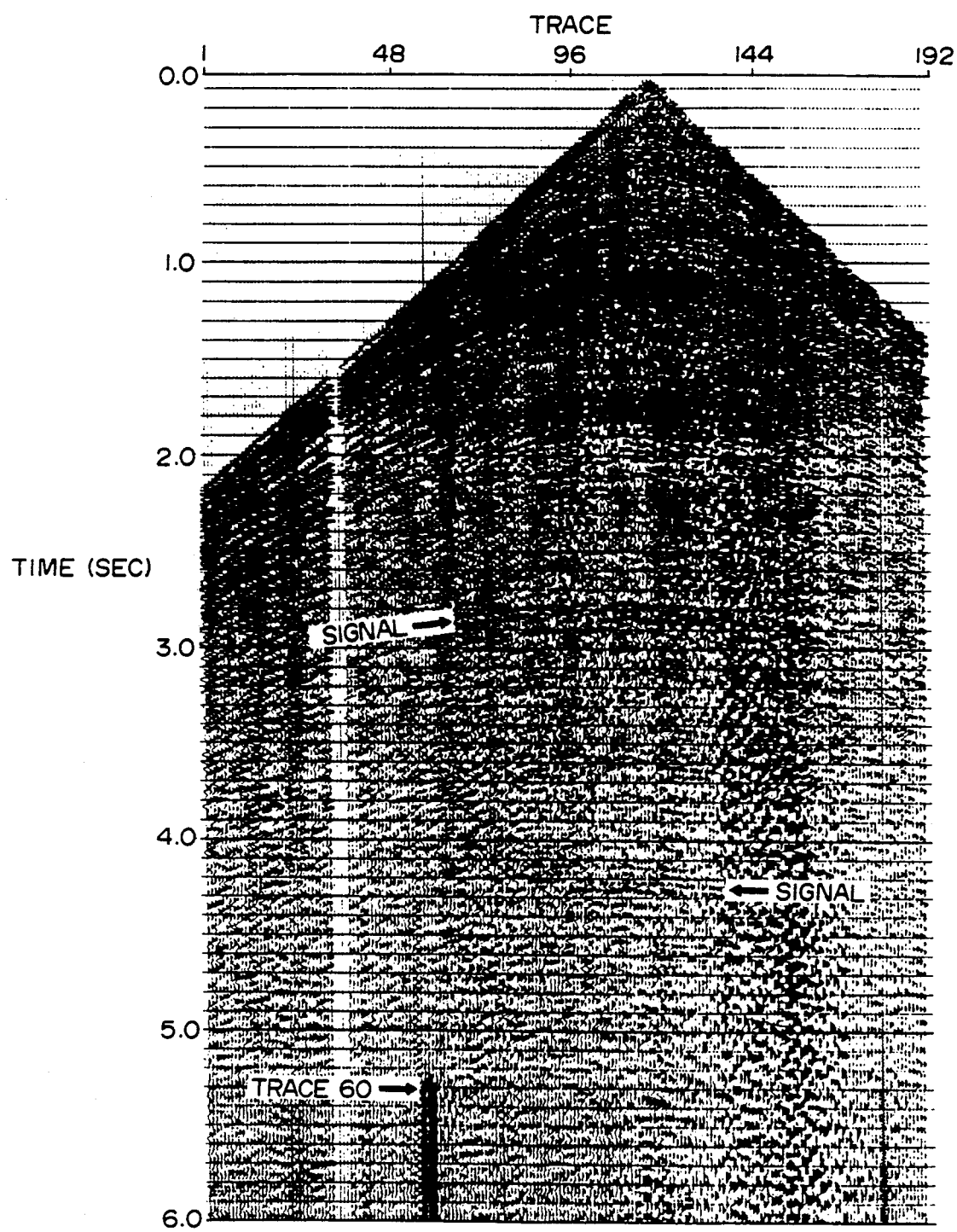

FIGS. 6, 7, and 8 show application of the invention to field data and comparison thereof to notch filtering.

FIG. 6 shows a field data example generated using a dynamite source. It will be appreciated by those of skill in the art that the record was highly contaminated with line interference at 60 Hz. Of interest is the fact that on trace number 60, a large instrumentation spike occurs at about 5.3 seconds, at which point the sinusoidal noise abruptly changes amplitude. FIG. 7 shows the result of application of a conventional notch filter as shown in the '903 patent discussed above to notch out the 60 Hz line noise. The result is a substantial improvement, in that the signal from reflectors can now be seen fairly clearly at several locations which are marked. However, while the notch filter has removed the 60 Hz line noise it has also notched the signal spectrum The spike at 5.3 seconds on trace 60 has produced a short impulse response in the record. It ceased because the notch filter was a finite impulse response filter.

The result of application of the filter according to the invention is shown in FIG. 8. In this case, the filter design gate was from 4-5 seconds, that is, the lower portion of the record was used to derive the reference sinusoid R and to calculate the Wiener-Levinson filter F. The method of the invention has successfully cancelled the 60 Hz interference, indicating that the line noise was substantially stationary during the period of the recording; note that relatively late arriving events can now be seen fairly clearly. Also note that the line noise on trace 60 below 5.3 seconds was not cancelled; the instrumentation spike and abrupt amplitude change in the sinusoid at that point introduces a nonstationarity into the noise, violating the assumption of the method of the invention, that is, that the noise is invariant over time.

Figure 9A:
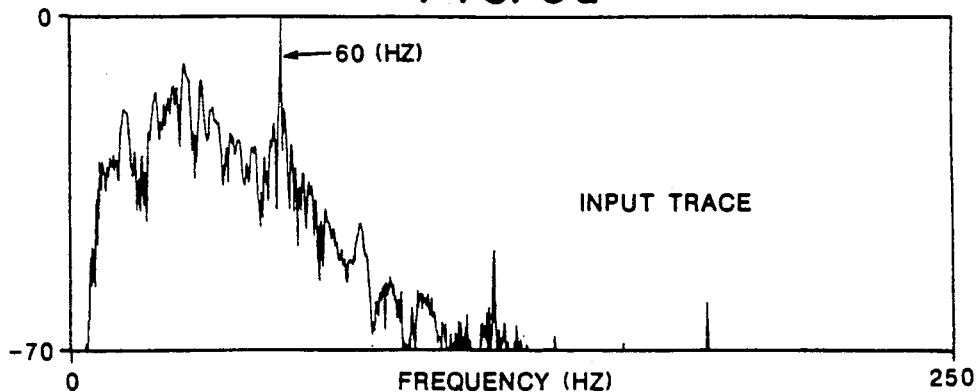
FIGS. 9(a-c) show frequency spectra for an input trace and the same trace after notch filtering and filtering according to the invention.
Figure 9B:
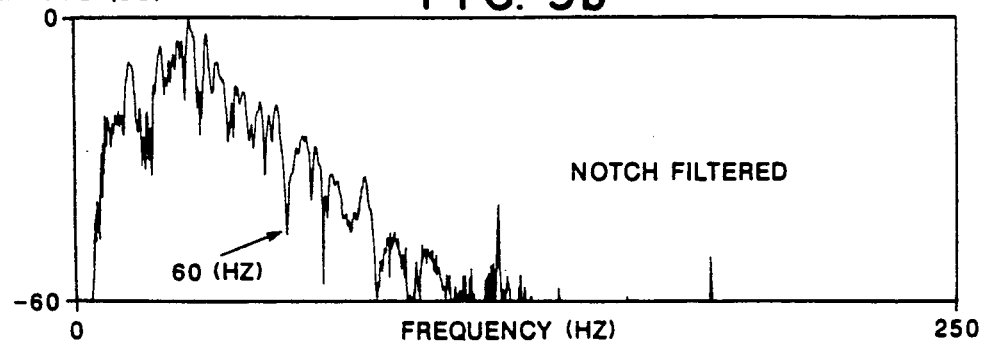
Figure 9C:
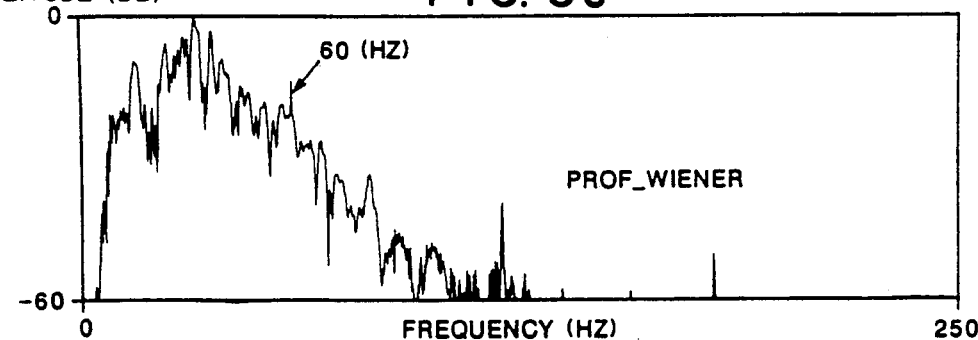

FIGS. 9(a-c) show frequency spectra for one of the traces, trace 23, of the records shown in FIG. 6, 7, and 8. That is, FIG. 9(a) shows the relative amplitudes of the frequencies of trace number 23 of the input record of FIG. 6. The strong 60 Hz spike is clearly observed and is marked. FIG. 9(b) shows the frequency spectrum for trace 23 of the notch-filtered data of FIG. 7. It will be observed that the 60 Hz frequency has indeed been successfully rejected, but that a band of noticeable bandwidth of frequencies around 60 Hz has also been greatly reduced in amplitude, that is, the signal spectrum has been distorted. Finally, FIG. 9(c) shows the frequency spectrum of trace 23 of the record of FIG. 8, after processing according to the invention. Here it will be observed that the 60 Hz spike has been successfully attenuated without affecting any of the signal frequencies, including 60 Hz. This demonstrates the utility of the method of the invention in removing a stationary sinusoid from a seismic data record.

More particularly, according to the invention, a reference trace is generated which precisely matches the interfering stationary noise; when the reference trace is subtracted from the record, the noise is removed. It will be appreciated that this method of removing the noise does not distort the remainder of the signal, even at the precise frequency of the stationary noise; by comparison, even an infinitely narrow notch filter (theoretically impossible in any event) will remove signal along with the noise at the chosen frequency.

It will be appreciated that there has been described a method for removal of a class of stationary sinusoids from seismic data which can be quite effective under appropriate circumstances. A number of modifications have been described to adapt the method for use under varying circumstances, and doubtless others will occur to those of skill in the art. Accordingly, the invention should not be measured by the above exemplary disclosure, but only by the following claims.

We claim:

1. A method of removing stationary sinusoidal noise corrupting a seismic data trace from the trace, comprising the steps of:

determining the precise frequency $F_o$ of the stationary sinusoidal noise;

computing a reference sinusoidal trace R of frequency $F_o$;

designing a filter F for shaping the reference sinusoidal trace to correspond precisely to the sinusoidal noise corrupting the data, wherein the amplitude and phase of the reference trace are adjusted to precisely match those of the sinusoid corrupting the data trace;

convolving the filter F thus designed with the reference trace to yield a noise estimate R'; and subtracting the noise estimate R' from the data trace.

2. The method of claim 1 wherein said filter design step involves the steps of:

computing the autocorrelation $R \times R$ of the reference sinusoidal trace R;

computing the crosscorrelation $D \times R$ of the data trace D with the reference trace R; and designing the filter F using the Wiener-Levinson algorithm, using the calculated autocorrelation and crosscorrelation values.

3. The method of claim 1 wherein said frequency $F_o$ of the stationary sinusoidal noise is determined by the following steps:

(a) making an initial estimate of the frequency $F_o$;

(b) computing a discrete Fourier transform with respect to the data trace for each of a plurality of frequencies closely spaced about $F_o$;

(c) selecting the frequency with respect to which the value of the discrete Fourier transform is maximized as a new $F_o$; and (d) repeating said steps (b) and (c), iteratively reducing the spacing of the plurality of frequencies in successive performances of step (b).

4. The method of claim 3, wherein said steps (b) and (c) are repeated, iteratively reducing the spacing of the plurality of frequencies, until the spacing of the frequencies with respect to which the discrete Fourier transforms are calculated is less than a predetermined value.

5. The method of claim 1 wherein the step of determining the precise frequency $F_o$ is carried out with respect to a portion of the seismic trace which is considered to be substantially entirely sinusoidal noise from a particular source.

6. The method of claim 1 wherein prior to subtraction of the noise estimate R' from a particular trace, the amplitude of the discrete Fourier transform corresponding to frequency $F_o$ is calculated and compared to a threshold value, to determine whether removal of the noise from that particular trace is necessary.

7. The method of claim 1 wherein said filter is a Wiener-Levinson least squares filter.

8. The method of claim 7 wherein said Wiener-Levinson filter is designed by successively calculating pairs of filter operators of increasingly greater order on either side of a determined lag of maximum correlation, calculating the prediction error of each of the two filter operators, and selecting the filter operator having the lesser error as the input to the subsequent stage of filter design.

9. The method of claim 1 wherein extended portions are added to the values of the reference sinusoid prior to said filter design step, and are separated therefrom prior to said subtraction step.

10. A method of removing a stationary sinusoid corrupting a data signal, comprising the steps of:

determining the precise frequency $F_o$ of the stationary sinusoidal noise;

computing a reference sinusoidal trace R of frequency $F_o$;

designing a filter F for shaping the reference sinusoidal trace to correspond precisely to the sinusoidal noise corrupting the data, wherein the amplitude and phase of the reference trace are adjusted to precisely match those of the sinusoid corrupting the data trace;

convolving the filter F thus designed with the reference trace to yield a noise estimate R′; and subtracting the noise estimate R′ from the data trace.

11. The method of claim 10 wherein said filter design step comprises the steps of:

computing the autocorrelation R×R of the reference sinusoidal trace R;

computing the crosscorrelation D×R of the data trace D with the reference trace R; and designing the filter using the Wiener-Levinson algorithm, employing the calculated autocorrelation and crosscorrelation values.

12. The method of claim 10 wherein said frequency $F_o$ of the stationary sinusoidal noise is determined by the following steps:

(a) making an initial estimate of the frequency $F_o$;

(b) computing a discrete Fourier transform with respect to the data trace for each of a plurality of frequencies closely spaced about $F_o$;

(c) selecting the frequency with respect to which the discrete Fourier transform is maximized as a new $F_o$; and (d) repeating said steps (b) and (c), iteratively reducing the spacing of the plurality of frequencies in successive performance of step (b).

13. The method of claim 10, wherein said steps (b) and (c) are repeated, iteratively reducing the spacing of the plurality of frequencies, until the spacing of the frequencies with respect to which the discrete Fourier transforms are calculated is less than a predetermined value.

14. The method of claim 10 wherein the step of determining the precise frequency $F_o$ is carried out with respect to a portion of the seismic trace which is considered to be substantially entirely sinusoidal noise from a particular source.

15. The method of claim 10 wherein prior to subtraction of the noise estimate R′ from a particular trace, the amplitude of the discrete Fourier transform corresponding to frequency $F_o$ is calculated and compared to a threshold value, to determine whether removal of the noise from that particular trace is necessary.

16. The method of claim 10 wherein said filter is a Wiener-Levinson least squares filter.

17. The method of claim 16 wherein said Wiener-Levinson filter is designed by successively calculating pairs of filter operators of increasingly greater order on either side of a determined lag of maximum correlation, calculating the prediction error of the filter operators, and selecting the filter operator having the lesser error as the input to the subsequent stage of filter design.

18. The method of claim 10 wherein extended portions are added to the values of the reference sinusoid prior to said filter design step, and are separated therefrom prior to said subtraction step.

* * * * *